United States Patent
Sasai

(10) Patent No.: US 7,850,880 B2
(45) Date of Patent: Dec. 14, 2010

(54) METHOD FOR FORMING ASPHERICAL OPTICAL ELEMENT

(75) Inventor: Hiroyuki Sasai, Kyoto (JP)

(73) Assignee: Shimadzu Corporation, Kyoto-shi, Kyoto (JP)

( * ) Notice: Subject to any disclaimer, the term of this patent is extended or adjusted under 35 U.S.C. 154(b) by 1520 days.

(21) Appl. No.: 11/084,319

(22) Filed: Mar. 18, 2005

(65) Prior Publication Data

US 2006/0038307 A1    Feb. 23, 2006

(30) Foreign Application Priority Data

Mar. 25, 2004    (JP)    ............................. 2004-088939

(51) Int. Cl.
   *B29D 11/00*    (2006.01)
   *G02B 3/00*    (2006.01)
   *G02B 5/08*    (2006.01)

(52) U.S. Cl. .................... 264/2.5; 264/1.1; 264/2.2; 264/2.3; 359/642; 359/838

(58) Field of Classification Search .................. 264/1.1, 264/2.2, 2.3, 2.5; 359/642, 838
   See application file for complete search history.

(56) References Cited

U.S. PATENT DOCUMENTS 5,411,430 A *    5/1995    Nishimura et al. ............. 451/1
2002/0033547 A1 *    3/2002    Kloosterboer et al. ...... 264/1.32

FOREIGN PATENT DOCUMENTS

JP    63-157103    10/1988
JP    2003-362489    11/2003

* cited by examiner

*Primary Examiner*—Monica A Huson
*Assistant Examiner*—Michael T Piery
(74) *Attorney, Agent, or Firm*—Rankin, Hill & Clark LLP

(57) ABSTRACT

An arrangement is made such that the magnitude of cure shrinkage obtained by multiplying the thickness of a resin layer 2 between a master mold 1 and a negative mold substrate 3 by the cure shrinkage ratio of the resin and the magnitude of cure shrinkage obtained by multiplying the thickness of a resin layer 4 between the negative mold 23 and the surface of the spherical or flat substrate 5 by the cure shrinkage ratio of the resin can be compensated for by each other. In accordance with this method, an aspherical optical element having a higher precision than ever can be formed at reduced cost by a replica method involving the addition of a resin layer to the surface of a spherical or flat substrate.

3 Claims, 1 Drawing Sheet

METHOD FOR FORMING ASPHERICAL OPTICAL ELEMENT

BACKGROUND OF THE INVENTION

The present invention relates to a method for forming an aspherical optical element for use in various measuring equipments.

In order to form an aspherical optical element at reduced cost, there has heretofore been used a resin replica method. In accordance with this method, the surface of an aspherical optical element which has been polished with a high precision as a master mold is treated with a release agent. The reversed shape of the master mold is then transferred to a resin provided on a spherical or flat substrate which is a negative matrix to form a negative mold. Thereafter, the reversed shape of the negative mold is transferred to a resin provided on a spherical or flat substrate to form an aspherical optical element having the same shape as that of the master mold.

Another resin replica method includes forming a negative mold the reversed shape of which is the same as that of the desired aspherical optical element, and then transferring the reversed shape of the negative mold to a resin provided on a spherical or flat substrate to form an aspherical optical element.

There have been proposed a method which includes forming the substrate of the product itself into a rough aspherical form to give a high precision (see, e.g., Patent Reference 1) and a method which includes forming a negative mold the shape of which is the same as the reversed shape of master mold (see, e.g., Patent Reference 2).

[Patent Reference 1]
  JP-A-No. Sho63-157103
[Patent Reference 2]
  Japanese Patent Application No. 2003-362489

In the case where an aspherical optical element is formed by a resin replica method using a spherical or flat substrate having the shape close to the aspherical shape of an optical element which is a master mold, when the difference in shape between the mold and the substrate is large, the resulting cure shrinkage of resin makes it difficult to provide the aspherical optical element thus formed with a high precision. The estimated value of deviation of precision is the product of the difference in shape and the cure shrinkage. For example, when the difference in shape is 30 µm and a resin having a cure shrinkage ratio of 2% is used, the precision is deteriorated by 0.6 µm (=30×2/100) merely by cure shrinkage. Since the reversed shape of the negative mold the precision of which has thus been deteriorated is used in another replica method, the surface precision of the product is further deteriorated.

In the case where the substrate of the product itself is formed into a rough spherical form as disclosed in the above cited Patent Reference 1 to solve the aforementioned problems, it is unavoidable that the production process is complicated as compared with that for flat or spherical substrate although it is a rough aspherical substrate. It is not wise from the standpoint of cost to use an aspherical optical element for all products.

There may be also used a method involving the use of a negative mold substrate the shape of which is the same as the reversed shape of master mold as disclosed in the above cited Patent Reference 2. However, in even this method, the problem of deterioration of surface precision due to cure shrinkage of resin is left unsolved.

SUMMARY OF THE INVENTION

The invention is worked out under these circumstances. In accordance with the invention, two replication steps involving replication from master mold to negative mold and replication from negative mold to aspherical optical element are effected to determine the shape of the negative mold substrate such that the cure shrinkage of cure is compensated for. An aim of the invention is to provide a method for forming an aspherical optical element having a higher precision at reduced cost using this negative mold substrate.

In order to solve the aforementioned problems, the method of the invention includes providing the negative mold substrate with a shape represented by the following equation 1.

$$F_N = -(2 \times F_M - F_R - s \times F_M)/(1-s) \qquad 1$$

wherein $F_N$ represents the shape of negative mold substrate; $F_M$ represents the shape of the aspherical optical element which is polished with a high precision as a master mold; $F_R$ represents the shape of the spherical or flat substrate of aspherical optical element as final product; and s represents the cure shrinkage ratio of the resin.

Using the substrate having a shape represented by the equation 1, a negative mold is formed by a resin replica method. In this manner, the magnitude of cure shrinkage obtained by multiplying the thickness of the resin between the master mold and the negative mold substrate by the cure shrinkage ratio of the resin and the magnitude of cure shrinkage of obtained by multiplying the thickness of the resin between the negative mold and the substrate of the aspherical optical element obtained by a resin replica method by the cure shrinkage ratio of the resin as final product can be compensated for by each other, making it possible to prevent the deterioration of surface precision.

According to aspect 1 of the present invention, there is provided a method for forming a negative mold for an aspherical optical element,
  the method comprising the steps of:
  polishing a surface of a master mold with a high precision;
  treating the surface of the master mold with a release agent;
  adding a resin to form a resin layer between a negative mold substrate and the surface of the master mold;
  curing the resin layer by a resin curing unit so that the resin layer and the negative mold substrate are bonded to each other to form a negative mold; and
  separating the negative mold from the master mold,
  wherein
  a shape of the negative mold substrate is represented by the equation:

$$F_N = -(2 \times F_M - F_R - s \times F_M)/(1-s),$$

$F_N$ representing the shape of the negative mold substrate;
$F_M$ representing the shape of the master mold;
$F_R$ representing the shape of the spherical or flat substrate of the aspherical optical element as final product; and
s representing the cure shrinkage ratio of the resin.

According to aspect 2 of the present invention, there is provided the method for forming an aspherical optical element by a replica method, comprising the step of:
  preparing the negative mold according to aspect 1;
  adding a resin which is the same resin used for the negative mold to form a resin layer between a spherical or flat substrate of an aspherical optical element and the negative mold; and separating the aspherical optical element from the negative mold.

According to aspect 3 of the present invention, there is provided the method for forming a negative mold for forming an aspherical optical element according to aspect 1, wherein the master mold is an aspherical optical element.

According to aspect 4, there is provided the aspherical optical element formed by the method according to aspect 1, includes at least one surface which is spherical or flat.

DETAILED DESCRIPTION OF THE PREFERRED EMBODIMENTS

Embodiment of implementation of the invention will be described hereinafter in connection with FIGS. 1 and 2.

Figure 1A:
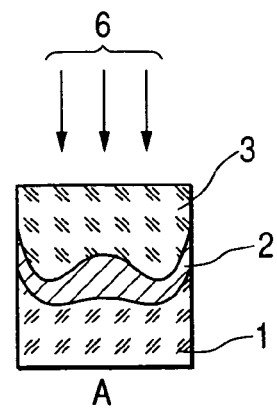
FIGS. 1A and 1B are sectional views illustrating a process of forming a negative mold from an aspherical master mold in the invention.
Figure 1B:
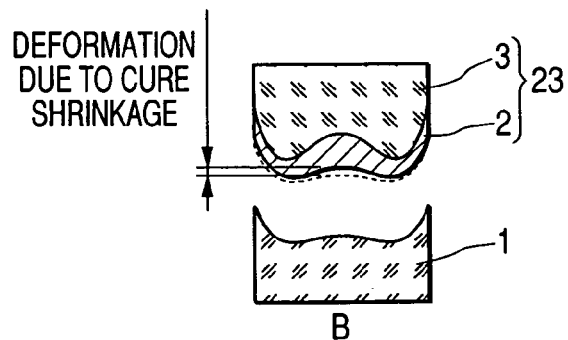

FIG. 1 depicts the process of forming a negative mold 23 from a master mold 1. Firstly, the surface of an aspherical optical element which has been polished with a high precision as master mold 1 is treated with a release agent. Subsequently, a resin layer 2 provided interposed between a negative mold substrate 3 which has been formed to have a shape represented by the equation 1 and the master mold 1 is cured by a resin curing unit 6 such as heat and light as shown in FIG. 1A. In this manner, the resin layer 2 and the aspherical substrate 3 are bonded to each other to form a negative mold 23. After the curing of the resin layer 2, the negative mold 23 is then separated from the master mold 1, as shown in FIG. 1B. The surface of the resin layer 2 has a shape which is the revered shape of the master mold that is deformed due cure shrinkage of the resin.

Figure 2A:
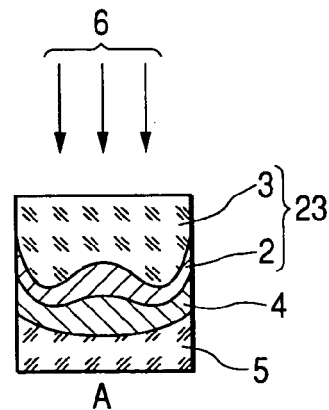
FIGS. 2A and 2B are sectional views illustrating a process of forming an aspherical optical element as a product from a negative mold in the invention.
Figure 2B:
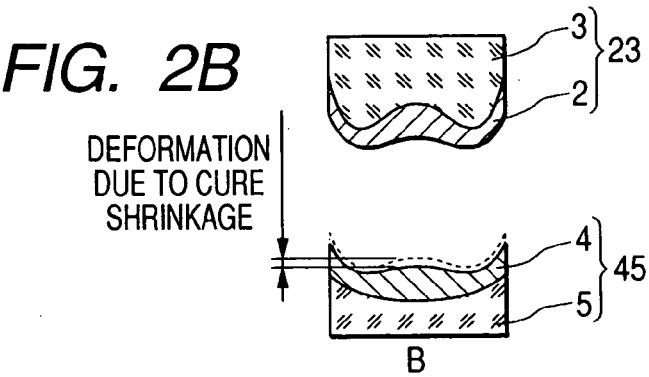

FIG. 2 depicts the process of forming an aspherical optical element 45 as a product from the negative mold 23 thus formed. The surface of the negative mold 23 is treated with a release agent in the same manner as in the case of the master mold 1. A resin layer 4 provided interposed between a spherical or flat substrate 5 and the negative mold 23 is then cured by the resin curing unit 6 as shown in FIG. 2A. The combination of the resin layer 4 and the spherical or flat substrate 5 made by curing is an aspherical optical element 45 formed by the invention. After the curing of the resin layer 4, the aspherical optical element 45 is then separated from the negative mold 23 as shown in FIG. 2B. The surface of the resin layer 4 thus obtained has a shape which is the reversed shape of the negative mold 23 that is deformed due to cure shrinkage of the resin. In this manner, the aforementioned deformation and the deformation developed in the formation of the negative mold 23 can be compensated for by each other when the shape satisfies the equation 1.

Thus, by adding the resin layer 4 to the surface of the spherical or flat substrate 5, the aspherical optical element 45 is formed.

EXAMPLE 1

A process of forming a glass lens one side of which has a rotationally symmetrical aspherical surface will be described hereinafter.

Firstly, an aspherical optical element which has been polished with a high precision is formed as a master mold. A material having a releasability with respect to UV-curing resin is then laminated on the aspherical surface of the lens by dipping method or vacuum metallizing method. During this procedure, a protective layer may be provided interposed between the release layer and the master mold to protect the surface of the aspherical lens.

Subsequently, the shape of the entire surface of the aspherical negative mold substrate is calculated from the master mold, the spherical glass substrate and the cure shrinkage ratio of the resin by the equation 1. During this procedure, the size of unit made by dividing the entire surface of the substrate for calculation is determined by the performance of NC (numerical control) machine. An aspherical negative substrate is then formed by NC lathe to have a shape thus calculated. It is not always necessary that the surface of the aspherical negative mold substrate be mirror-finished. The calculation of shape doesn't need to be conducted previously but may be successively conducted during NC machining.

A UV-curing resin is then dropped onto the surface of the aspherical negative mold substrate. The UV-curing resin is then clamped between the aspherical negative mold substrate and the master mold. The UV-curing resin is then irradiated with UV ray to cure. Thereafter, the master mold and the aspherical negative mold substrate are separated from each other. The surface of the aspherical negative mold substrate thus obtained has a shape which is the reversed shape of the master mold that is deformed by the amount corresponding to cure shrinkage of the UV-curing resin. During this procedure, the surface roughness, too, is transferred to the resin on the surface of the negative mold. Since the entire combination of the aspherical negative mold substrate and the resin layer is used as a negative mold, a release layer is provided on the surface of the negative mold similarly to the master mold.

Separately, a glass substrate having a spherical surface close to the aspherical surface is formed by an ordinary polishing method. A UV-curing resin provided on the surface of the negative mold by dropping is covered by the spherical glass substrate. The UV-curing resin is then irradiated with UV ray to cure. Thereafter, when the negative mold is separated from the spherical glass substrate to which the resin layer has been bonded, the reversed shape of the negative mold which is deformed by the amount corresponding to cure shrinkage of the resin is transferred to the spherical glass substrate side so that the two deformations are compensated for by each other, thereby providing an aspherical lens having the same shape as that of the master mold.

In the case where both the two surfaces are aspherical, the same process may be effected for both the two surfaces.

EXAMPLE 2

A process of forming an off-axis ellipsoidal mirror will be described hereinafter.

An off-axis ellipsoidal mirror which has been polished with a high precision is formed as a master mold. Gold is then vacuum-deposited on the surface of the master mold to form a release layer. Subsequently, An aspherical negative mold substrate having a shape calculated by the equation 1 from the master mold, the spherical glass substrate and the cure shrinkage ratio of the resin is then formed by NC lathe.

A thermosetting resin is then dropped onto the surface of the off-axis ellipsoidal substrate. The thermosetting resin is then heated while being covered by the off-axis ellipsoidal surface of the master mold. The thermosetting resin is then heated to cure. Thereafter, the master mold and the off-axis ellipsoidal substrate are separated from each other. The surface of the off-axis ellipsoidal substrate thus obtained has a shape which is the reversed shape of the master mold that is deformed by the amount corresponding to cure shrinkage of the resin. Since the entire combination of the aspherical negative substrate and the resin layer is used as a negative mold, gold is vacuum-deposited on the resin layer to form a release layer. Subsequently, a metallic material to be used as substrate of off-axis ellipsoidal mirror is machined to have a spherical shape close to that of the off-axis ellipsoidal surface.

A thermosetting resin is then dropped onto the surface of the negative mold. The thermosetting resin is then heated while being covered by the aforementioned spherical metallic substrate to cure. Thereafter, the negative mold and the spherical metallic substrate are separated from each other. Aluminum or gold is then vacuum-deposited on the thermosetting resin on the surface of the spherical metallic substrate thus separated to form an off-axis ellipsoidal mirror.

The process of forming the aspherical optical element of the invention is not limited to the aforementioned examples. The invention can be widely applied by making various changes therein without departing from the scope thereof.

As mentioned above, the substrate of the negative mold formed according to the invention has an aspherical form determined by the aforementioned equation requiring somewhat high working cost. However, once formed by replica method, the negative mold of the invention can be repeatedly used any times, making it possible to form an aspherical optical element at a drastically reduced cost as compared with the related art method which includes forming the substrate of the product itself into an aspherical form. In other words, the formation method according to the invention has an excellent advantage that an aspherical optical element having a higher precision can be mass-produced at reduced cost.

What is claimed is:

1. A method for forming a negative mold for an aspherical optical element, the method comprising the steps of:

preparing a master mold and a first substrate;

adding resin to form a single first resin layer between the first substrate and the master mold;

curing the first resin layer so that the first resin layer and the first substrate are bonded to each other to form the negative mold; and separating the negative mold from the master mold, wherein the first resin layer is a single layer; and wherein a shape of the first substrate is represented by the equation:

$$F_N = -(2 \times F_M - F_R - s \times F_M)/(1-s),$$

$F_N$ representing a shape of the first substrate;

$F_M$ representing a shape of the master mold;

$F_R$ representing a shape of a second substrate having a flat or spherical surface for forming the aspherical optical element with the negative mold; and s representing a cure shrinkage ratio of the resin.

2. A method for forming an aspherical optical element comprising the steps of:

preparing the negative mold according to claim 1 and a second substrate having a flat or spherical surface;

adding resin which is the same as the resin used for forming the negative mold to form a second resin layer between the negative mold and the surface of the second substrate;

curing the second resin layer so that the second resin layer and the second substrate are bonded to each other to form the aspherical optical element; and separating the aspherical optical element from the negative mold.

3. The method for forming a negative mold for forming an aspherical optical element according to claim 1, wherein the master mold is an aspherical optical element.

* * * * *